United States Patent
Chan Perez et al.

(10) Patent No.: US 11,732,630 B1
(45) Date of Patent: Aug. 22, 2023

(54) DIESEL EXHAUST FLUID INJECTION SHIELD AND DIESEL EXHAUST FLUID INJECTION SYSTEM

(71) Applicant: DEERE & COMPANY, Moline, IL (US)

(72) Inventors: Luis Mario Chan Perez, El Marques (MX); Anthony M. Straub, Cedar Falls, IA (US); Stephen M. Bonny, Waterloo, IA (US); Derek A. Weiss, Cedar Falls, IA (US); Matthew R. Evers, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/809,324

(22) Filed: Jun. 28, 2022

Related U.S. Application Data (60) Provisional application No. 63/268,558, filed on Feb. 25, 2022.

(51) Int. Cl.
*F01N 3/20* (2006.01)
*F01N 3/28* (2006.01)

(52) U.S. Cl.
CPC ......... *F01N 3/2066* (2013.01); *F01N 3/2892* (2013.01); *F01N 2240/20* (2013.01); *F01N 2260/20* (2013.01); *F01N 2510/02* (2013.01); *F01N 2510/08* (2013.01); *F01N 2530/02* (2013.01); *F01N 2530/04* (2013.01); *F01N 2610/02* (2013.01); *F01N 2610/14* (2013.01); *F01N 2610/1453* (2013.01); *F01N 2900/1806* (2013.01)

(58) Field of Classification Search
CPC combination set(s) only.
See application file for complete search history.

(56) References Cited

U.S. PATENT DOCUMENTS

| | | | |
|---|---|---|---|
| 8,261,537 B2 | 9/2012 | Osbat et al. | |
| 8,622,316 B2 | 1/2014 | Haeberer et al. | |
| 8,776,510 B2 | 7/2014 | Stein et al. | |
| 8,991,160 B2 | 3/2015 | Katou et al. | |
| 9,366,169 B2 | 6/2016 | Pohl et al. | |
| 9,528,414 B2 | 12/2016 | Mitchell et al. | |
| 9,664,081 B2* | 5/2017 | Rusch | F01N 3/2066 |
| 11,098,625 B2 | 8/2021 | El-Gammal et al. | |
| 11,268,424 B2* | 3/2022 | Kimura | F01N 3/2066 |
| 2016/0363027 A1* | 12/2016 | Lorenz | F01N 3/2892 |
| 2017/0342886 A1 | 11/2017 | Gavin et al. | |
| 2019/0128167 A1* | 5/2019 | Willats | F01N 3/035 |
| 2019/0201854 A1* | 7/2019 | Cvelbar | B01D 53/90 |

(Continued)

FOREIGN PATENT DOCUMENTS

| | | |
|---|---|---|
| DE | 102009027713 A1 | 1/2011 |
| EP | 2825738 B1 | 10/2016 |
| JP | 5971535 B2 | 8/2016 |

*Primary Examiner* — Binh Q Tran (57) ABSTRACT

A shield for a diesel exhaust fluid injector is mounted in an opening in a side wall of an exhaust gas aftertreatment system of an internal combustion engine. The diesel exhaust fluid injector is configured to inject diesel exhaust fluid in a direction generally normal to the side wall into a mixer positioned in an exhaust gas stream. The shield includes a first portion extending axially and a second portion extending radially inwardly from the first portion.

16 Claims, 8 Drawing Sheets

(56) References Cited

U.S. PATENT DOCUMENTS

2019/0323402 A1* 10/2019 Tucker ................ B01F 23/2132
2020/0123955 A1*  4/2020 Liu ....................... F01N 3/2803
2020/0217232 A1*  7/2020 Kurpejovic ........ B01D 53/9431

* cited by examiner

DIESEL EXHAUST FLUID INJECTION SHIELD AND DIESEL EXHAUST FLUID INJECTION SYSTEM

CROSS-REFERENCE TO RELATED APPLICATIONS

This application claims priority to U.S. Provisional Application No. 63/268,558, titled DIESEL EXHAUST FLUID INJECTION SHIELD, filed Feb. 25, 2022, which is hereby incorporated by reference in its entirety.

BACKGROUND

Diesel internal combustion engines may include aftertreatment systems intended to treat exhaust gas produced by the internal combustion engine. Aftertreatment systems may include diesel exhaust fluid (DEF) that may be injected by an injector, dosing module, or other device into an exhaust gas stream.

SUMMARY

According to an aspect of the present disclosure, a shield for a diesel exhaust fluid injector is mounted horizontally in an opening in a side wall of an exhaust gas aftertreatment system of an internal combustion engine. The diesel exhaust fluid injector is configured to inject diesel exhaust fluid in a direction generally normal to the side wall into a mixer positioned in an exhaust gas stream such that exhaust gas flows in a substantially vertical direction through a housing of the exhaust gas aftertreatment system. The shield includes a first portion extending axially and configured to be coaxial with the diesel exhaust fluid injector between the side wall of the exhaust gas aftertreatment system and the diesel exhaust fluid injector, a second portion extending radially inwardly from the first portion and configured to contact and at least partially cover an annular region of an injector face extending radially at an injection end of the diesel exhaust fluid injector, and a drip lip extending axially away from the second portion and configured to direct diesel exhaust fluid away from the injector face and into the exhaust gas stream.

The drip lip may extend both axially and radially away from the second portion. The drip lip may include a curved contour extending axially and radially away from the second portion. The curved contour may include a first contour portion configured to extend substantially perpendicular to the exhaust gas stream. The curved contour may further include a second contour portion configured to extend at an angle between 0 and 80 degrees relative to the exhaust gas stream. The drip lip may extend radially and axially outward along a straight line. The drip lip may be configured to extend into the exhaust gas stream a first distance that is equal to or greater than a second distance defined by a length of the first portion. The drip lip may be configured to extend into the exhaust gas stream a first distance that is less than a second distance defined by a length of the first portion.

According to an aspect of the present disclosure, a diesel exhaust fluid injection system for an exhaust gas aftertreatment system for an internal combustion engine has an exhaust gas stream flowing substantially vertically through a housing of the exhaust gas aftertreatment system. The diesel exhaust fluid injection system includes a diesel exhaust fluid injector, having an injector face extending radially at an injection end of the diesel exhaust fluid injector, and mounted horizontally in an opening in a side wall of the exhaust gas aftertreatment system and configured such that diesel exhaust fluid is injected in a direction generally normal to the side wall into a mixer positioned in the exhaust gas stream, and a shield extending radially inwardly and contacting and at least partially covering an annular region of the injector face at a location axially inside of the side wall of the exhaust gas aftertreatment system. The shield includes a drip lip extending away from the injector face and into the exhaust gas stream and configured to direct diesel exhaust fluid away from the injector face and into the exhaust gas stream.

The drip lip may extend both axially and radially away from the injector face. The drip lip may include a curved contour extending axially and radially away from the injector face. The curved contour may include a first contour portion extending substantially perpendicular to the exhaust gas stream. The curved contour may further include a second contour portion extending at an angle between 0 and 80 degrees relative to the exhaust gas stream. The drip lip may extend radially and axially outward along a straight line. The drip lip may extend into the exhaust gas stream a first distance that is equal to or greater than a second distance defined by a depth of the opening of the side wall. The drip lip may extend into the exhaust gas stream a first distance that is less than a second distance defined by a depth of the opening of the side wall.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
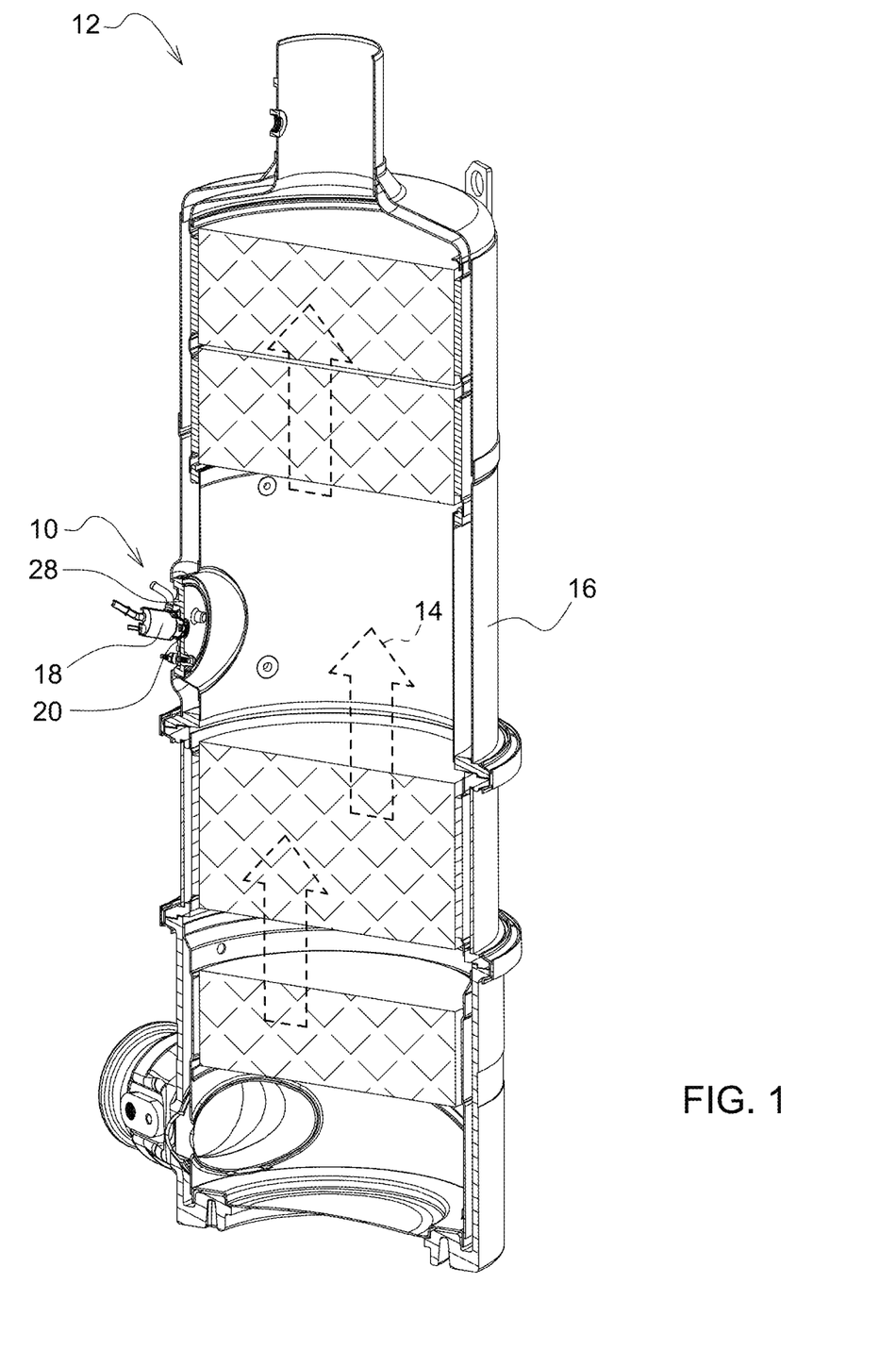
FIG. 1 is a cross-sectional view of an exhaust gas aftertreatment system in accordance with one or more embodiments of the present disclosure.

Referring now to FIG. 1, a cross sectional view of a diesel exhaust fluid injection system 10 for an exhaust gas aftertreatment system 12 for an internal combustion engine (not shown) is illustrated in accordance with one or more embodiments of the present disclosure. Any system embodiment referenced in the present disclosure refers to one or both of the DEF injection system 10 and the exhaust gas aftertreatment system 12. An exhaust gas stream 14 flows substantially vertically, in the illustrated embodiment, through a housing 16 of the exhaust gas aftertreatment system 12 as shown in FIG. 1 and as further described and/or illustrated in the present disclosure. In one or more additional embodiments of the present disclosure, the exhaust gas stream 14 flows horizontally or otherwise non-vertically such that the housing 16 and/or another portion of the exhaust gas aftertreatment system 12 is aligned horizontally or otherwise non-vertically. The exhaust gas aftertreatment system 12 includes a side wall 28 that may include a flange or other structure, such as for mounting, and may be planar, curved, or formed as part of a cylindrical aftertreatment housing or system.

Figure 2:
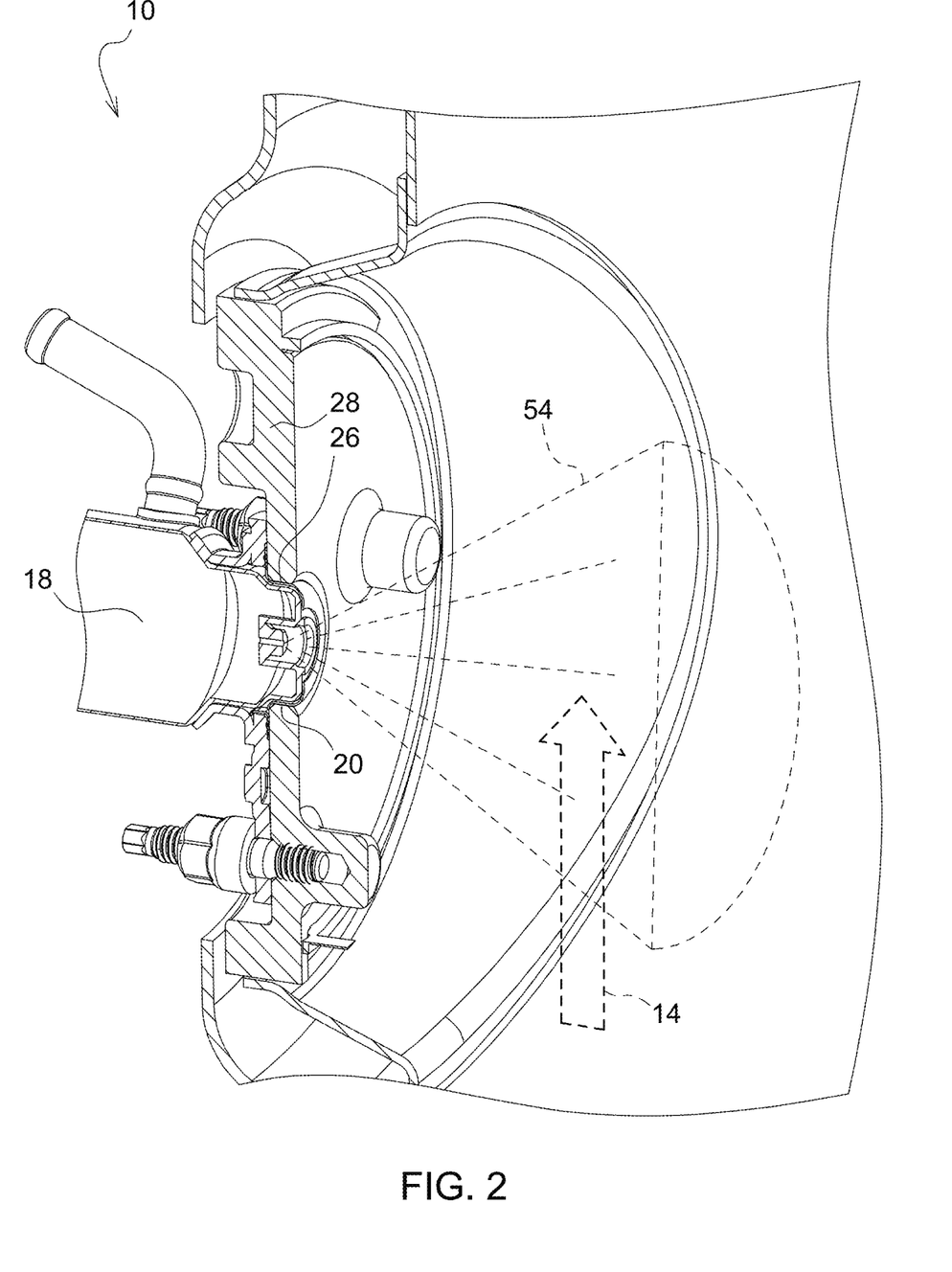
FIG. 2 is a cross-sectional view of a diesel exhaust fluid injection system and shield in accordance with one or more embodiments of the present disclosure.

Referring now to FIG. 2 with continuing reference to FIG. 1, the diesel exhaust fluid (DEF) injection system 10 includes a DEF injector 18 and a shield 20. The system 10 provides a DEF injection spray 54 into an exhaust gas stream 14. The DEF injector 18 may be referred to herein as a dosing module.

For the embodiment of the aftertreatment system 12 illustrated herein, the vertical system causes exhaust gas to move upward in the system 12 illustrated in FIGS. 1 and 2. As will be explained further herein, gravity may allow, urge, or provide a force to cause DEF to drip, fall, or otherwise move downward in a direction parallel to or substantially parallel to the direction of the flow of the exhaust gas stream 14. The DEF injection spray 54, as illustrated in the illustrated view of FIG. 2, is oriented generally or substantially perpendicular to the exhaust gas stream 14 and/or the force of gravity. In this regard, and as illustrated in further detail in FIGS. 3 and 4, the DEF injector 18 is mounted horizontally in an opening 26 in the side wall 28 of the exhaust gas aftertreatment system 12. The DEF injector 18 may be configured such that DEF is injected in a direction generally or substantially normal to the side wall 28 and/or the exhaust gas stream 14 into a mixer (not illustrated) positioned in the exhaust gas stream 14.

Figure 3:
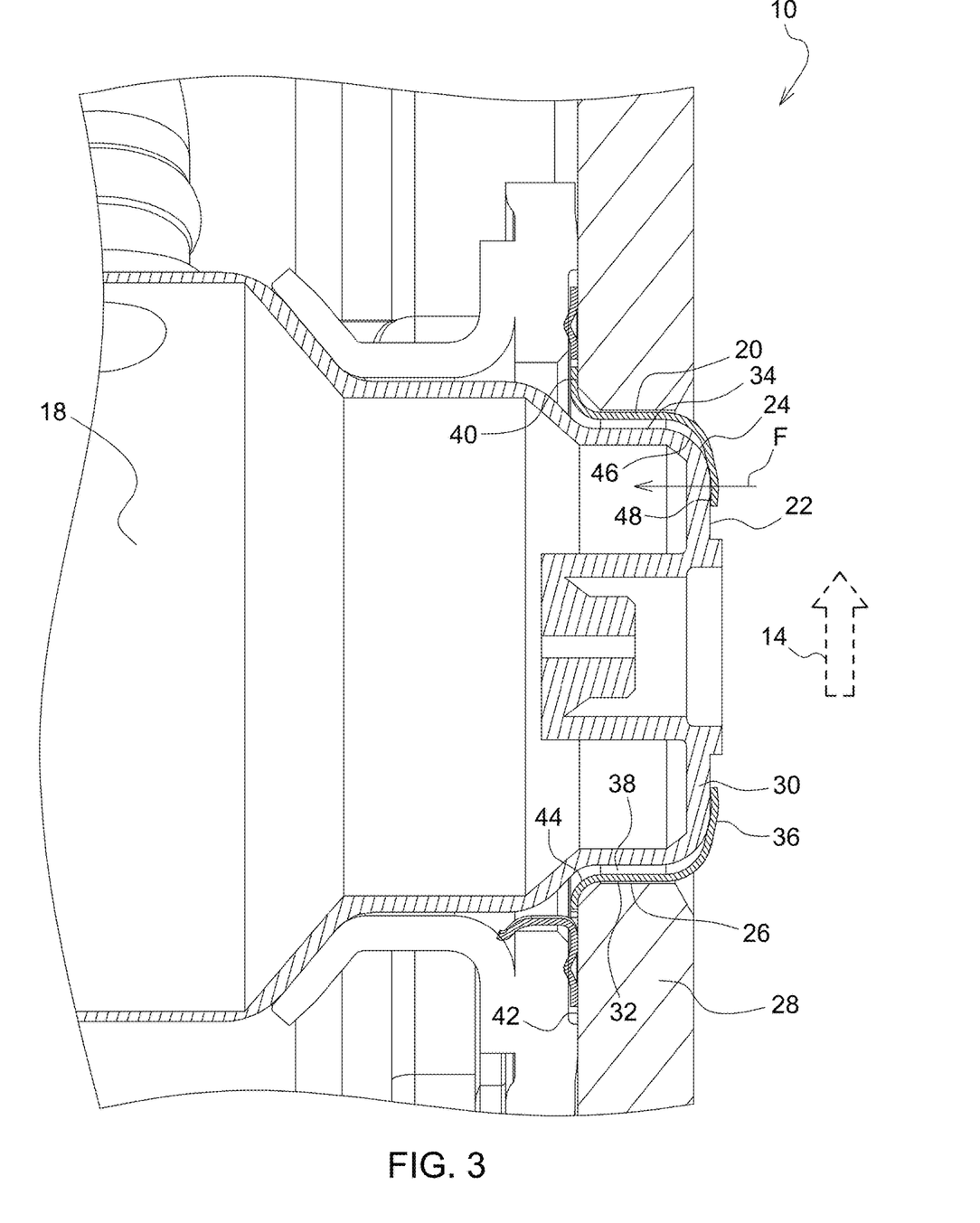
FIG. 3 is a cross-sectional view of a diesel exhaust fluid injection system and shield in accordance with one or more embodiments of the present disclosure.
Figure 4:
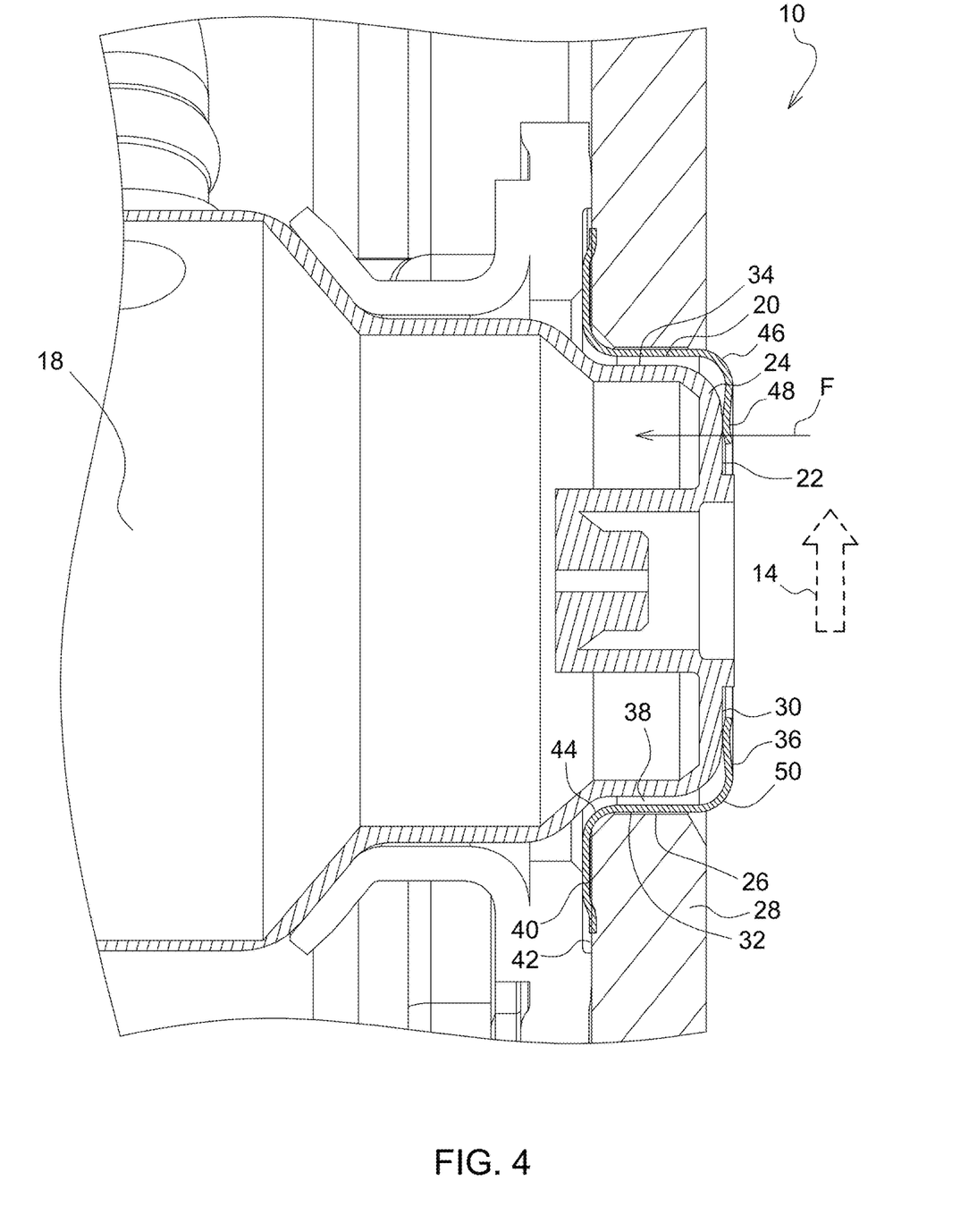
FIG. 4 is a cross-sectional view of a diesel exhaust fluid injection system and shield in accordance with one or more embodiments of the present disclosure.

Referring now to FIGS. 3 and 4, the DEF injector 18 includes an injector end 24 and an injector face 22 extending radially, relative to the DEF injector 18, at the injection end 24. The system 10 further includes the shield 20 that extends radially inwardly relative to the DEF injector 18 as illustrated in FIGS. 3 and 4 and as further described herein. The shield 20 contacts and at least partially covers an annular region 30 of the injector face 22 in the embodiments of FIGS. 3 and 4 and additional embodiments herein. The shield 20 contacts and/or covers the annular region 30 at a location inside of the side wall 28, relative to the housing 16, of the exhaust gas aftertreatment system 12 in an embodiment.

At least a portion of the shield 20 is spaced from the DEF injector 18 in one or more embodiments. As illustrated in FIGS. 3 and 4, the shield 20 may be radially and/or axially spaced from the DEF injector 18. The shield 20 illustrated in FIG. 3 is spaced radially from the DEF injector 18. The spacing creates a gap to improve thermal insulation between the relatively low temperature of the DEF injector 18 and the relatively higher temperature side wall 28 and/or other components of the system 10. The shield 20 illustrated in FIG. 4 is spaced radially and axially from the DEF injector 18. The spacing of the shield 20 of FIG. 4 provides the thermal benefits, as described with regard to the shield 20 of FIG. 3, but also provides a lip portion 50 that extends axially away from the injector face 22 to deflect or otherwise direct DEF away from the DEF injector 18 and/or the side wall 28.

The shield 20 and the DEF injector 18 of any one or more embodiments described herein cooperate to close, occupy the area of the opening 26 to fill, or otherwise close the opening 26 in the side wall 28 of exhaust gas aftertreatment system 12. The shield 20 shown in FIGS. 3 and 4 includes a first portion 32 extending axially and, in at least one embodiment, surrounding an outer circumference 34 of the diesel exhaust fluid injector 18 between the side wall 28 of the exhaust gas aftertreatment system 12 and the diesel exhaust fluid injector 18. The first portion 32 of one or more embodiments abuts the side wall 28 at the opening 26 and/or is flush with, in surface contact with, or positioned against the side wall 28 at the opening 26.

Figure 5:
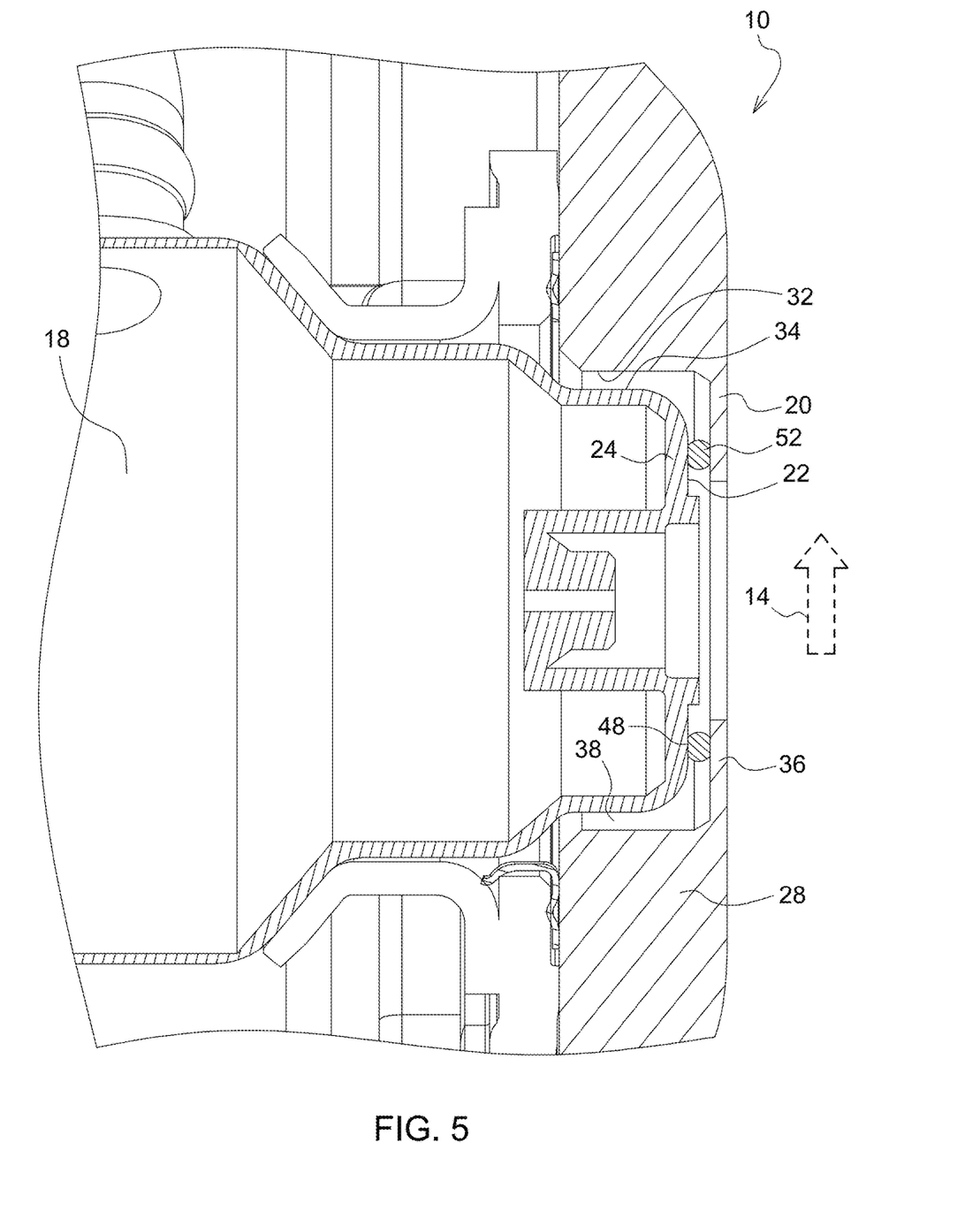
FIG. 5 is a cross-sectional view of a diesel exhaust fluid injection system and shield in accordance with one or more embodiments of the present disclosure.

Referring to FIG. 5, the first portion 32 may be integrally formed with the side wall 28 in an embodiment such that the side wall 28 defines an annular clearance 38 around the outer circumference 34 of the diesel exhaust fluid injector 18. In additional embodiments, such as those shown in FIGS. 3 and 4, the first portion 32 may be press fit against the side wall 28 in another embodiment such that the first portion 32 defines the annular clearance 38 around the outer circumference 34 of the diesel exhaust fluid injector 18. In additional embodiments not illustrated, the first portion 32 of the shield 20 is spaced from the side wall 28 such that a minimal gap or clearance is present between the shield 20 and the side wall 28.

The shield 20 further includes a second portion 36 extending radially inwardly, relative to the DEF injector 18, from the first portion 32. The second portion 36 contacts and at least partially covers the injector face 22 as illustrated in FIGS. 3-8. The first portion 32 is substantially orthogonal to the second portion 36 in an embodiment. As illustrated in FIG. 3, the first portion 32 meets the second portion 36 at an interface 46 having a curved cross-section in an embodiment.

As illustrated in each of FIGS. 3-8, the second portion 36 terminates at a sealing lip 48 in an embodiment. The sealing lip 48 is retained against the annular region 30 of the injector face 22 by a resilient member of the shield 20 in an embodiment. The resilient member may be a metallic portion formed integrally with the second portion 36 and shaped to provide a spring or urging force in an axial direction F against the injector face 22 in accordance with one or more embodiments herein.

In one or more embodiments, a sealant 52, such as RTV in a non-limiting example, is used to retain the shield 20 for assembly and/or to improve the sealing of the shield 20 against the DEF injector 18, the side wall 28, and/or any other portion of the system 10. The sealant 52 may also include or alternatively be a seal, such as an O-ring, gasket, and/or other seal, including an elastomeric or metallic seal in non-limiting examples. The sealant 52 and/or seal may be positioned on the second portion 36, such as illustrated in FIG. 5, at the interface 46 formed between the first portion 32 and the second portion 36, and/or between one or both of the first portion 32 and the second portion 36 and the DEF injector 18 in various embodiments.

FIG. 5 illustrates an embodiment having the shield 20 integrally formed with the side wall 28 such that the shield 20 may be formed as part of an existing casting or geometry of the side wall 28 or separately formed and attached to the side wall 28 or another portion of the aftertreatment system 12. The shield 20 of FIG. 5 provides added mass that is configured to enhance heat retention and/or thermal insulation of the DEF injection system 10. The shield 20 of FIG.

5 further reduces or eliminates the crevice, gap, and/or clearance between the side wall 28 and the DEF injector 18 referenced herein. The sealant 52 of the shield 20 of FIG. 5 further seals a gap or clearance between the side wall 28 and the injector face 22 of the DEF injector 18.

As illustrated in FIGS. 4 and 5, the second portion 36 is spaced or at least partially spaced from the injector face 22 in one or more embodiments.

The shield 20 may further include a third portion 40 extending radially outwardly from the first portion 32. The third portion 40 extends from the first portion 32 at an axial end opposite from the second portion 36, as illustrated in FIGS. 3 and 4. The third portion 40 is positioned against an outer surface 42 of the side wall 28 in an embodiment. The second portion 36 is substantially orthogonal to the third portion 40 in an embodiment. The second portion 36 meets the third portion 40 at an interface 44 having a curved cross-section in an embodiment, as illustrated in FIGS. 3 and 4.

Figure 6:
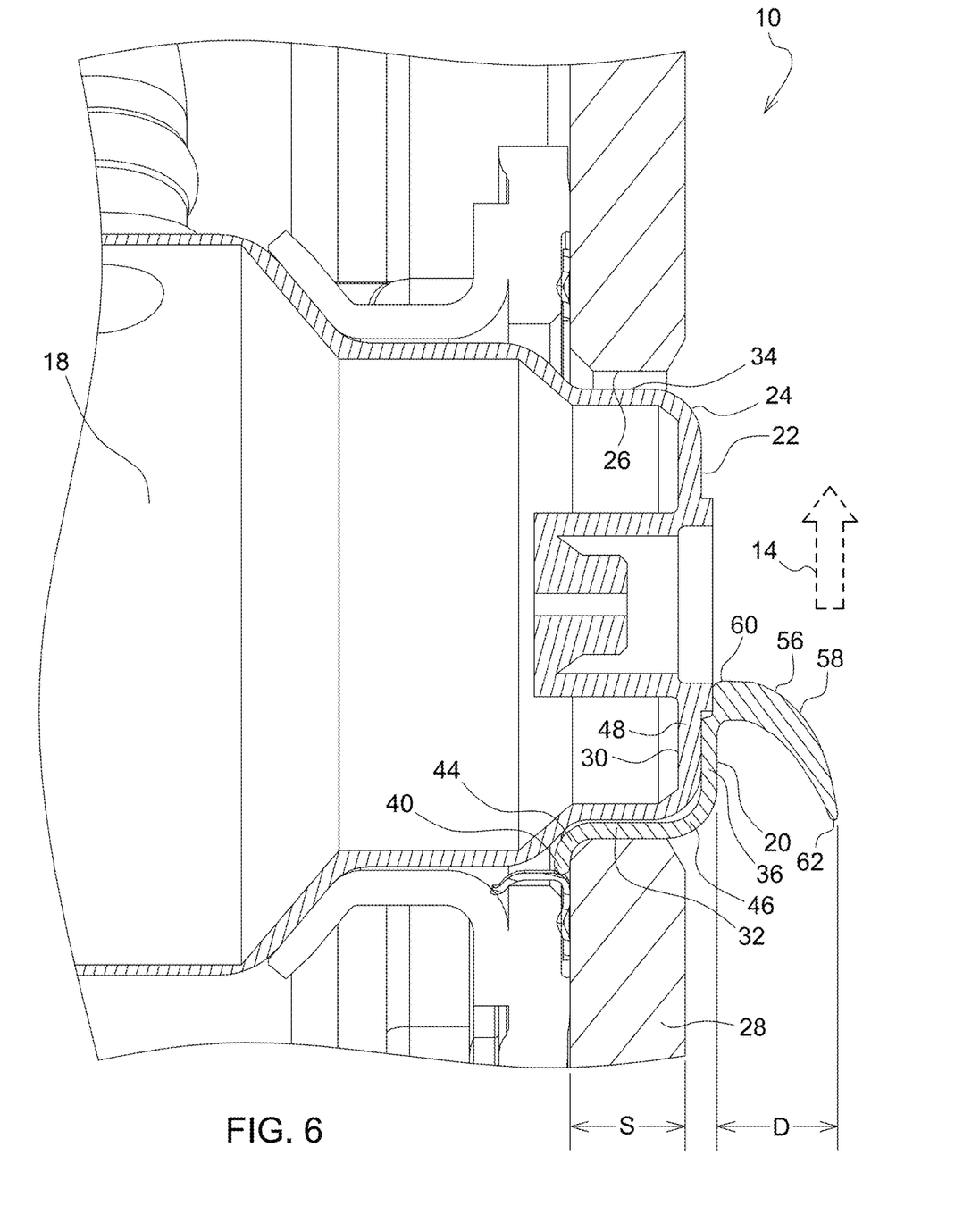
FIG. 6 is a cross-sectional view of a diesel exhaust fluid injection system and shield in accordance with one or more embodiments of the present disclosure.
Figure 7:
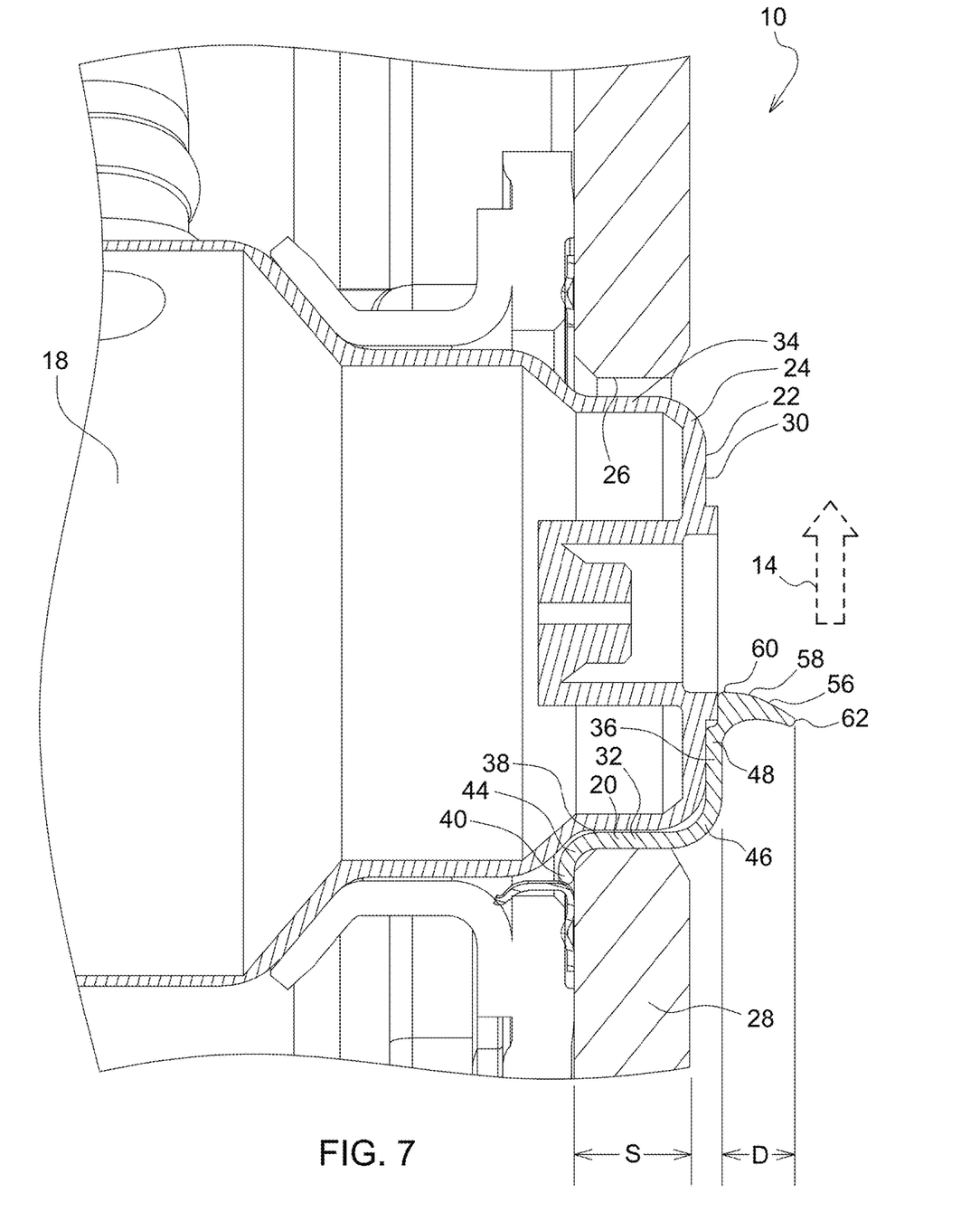
FIG. 7 is a cross-sectional view of a diesel exhaust fluid injection system and shield in accordance with one or more embodiments of the present disclosure.
Figure 8:
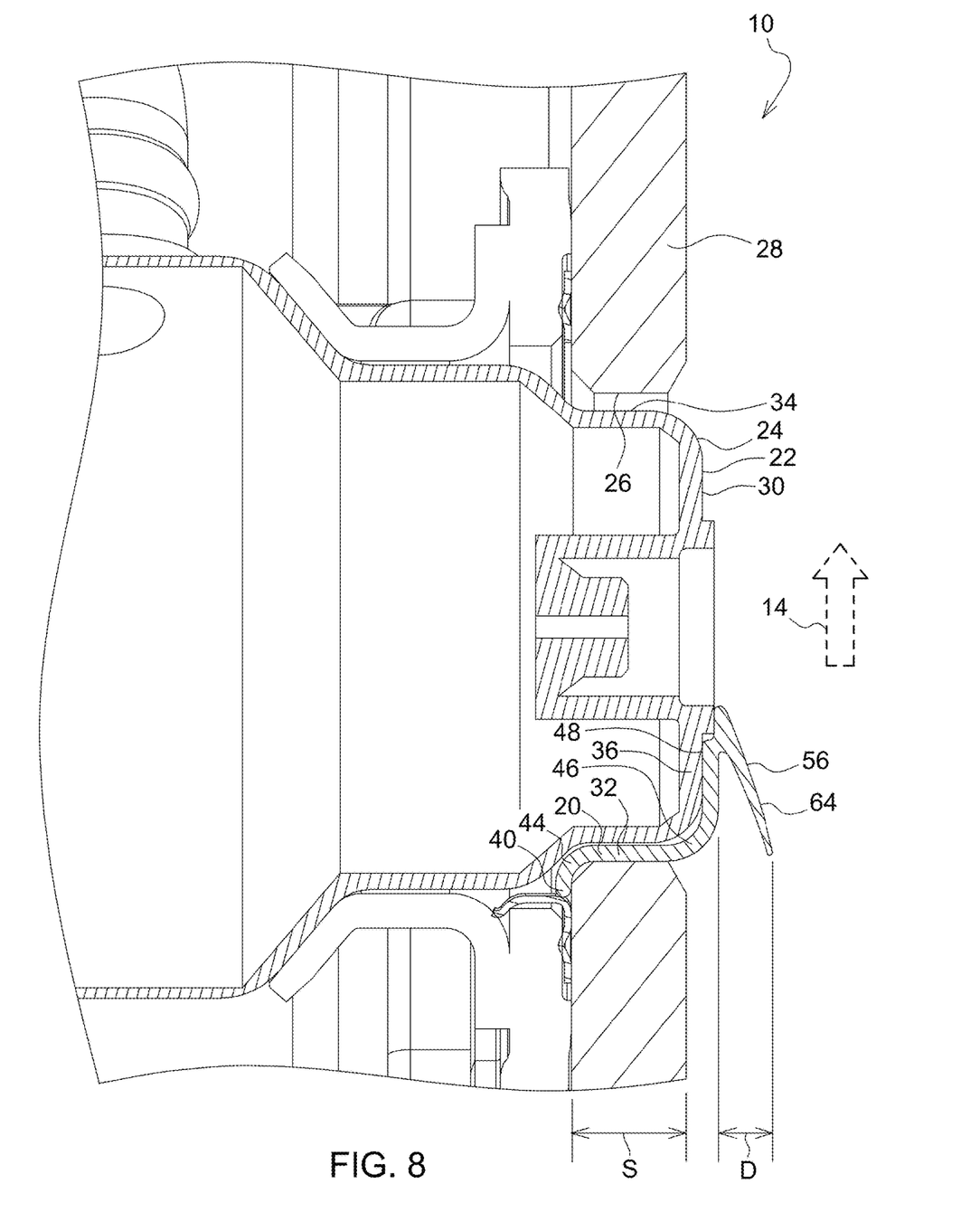
FIG. 8 is a cross-sectional view of a diesel exhaust fluid injection system and shield in accordance with one or more embodiments of the present disclosure.

Referring now to FIGS. 6-8, the shield 20 of one or more embodiments includes a drip lip 56 extending away from the injector face 22 of the DEF injector 18. In the illustrated embodiments, the drip lip 56 extends at least partially into the exhaust gas stream 14 in order to guide or direct the DEF away from the DEF injector 18 and/or the side wall 28 and into the exhaust gas stream 14. The drip lip 56 of FIGS. 6-8 extends both axially and radially outward relative to the DEF injector 18.

The shield 20 of FIGS. 6-8 is shown as being located under or on only one side of the DEF injector 18. However, it will be appreciated that the shield 20, the drip lip 56, or any portion thereof in FIGS. 6-8 may surround the DEF injector 18 to form an annular, circumferentially extending structure, similar to the shield 20 of FIGS. 3 and 4. In further embodiments, the shield 20 or any portion thereof of any embodiments described herein may be located on only the lower side or fewer than all sides of the DEF injector 18. In such embodiments, a continuous annular structure is not formed by the shield 20 and/or one or more portions or features thereof, and/or the shield 20 or a portion thereof may be separated into multiple circumferentially spaced portions.

Referring to FIGS. 6 and 7, the drip lip 56 of one or more embodiments extends radially and axially outward along a curved contour 58. In such embodiments, the curved contour 58 may include a first contour portion 60 being generally or substantially perpendicular to the exhaust gas stream 14 and second contour portion 62 being generally or substantially angled to and/or parallel to the exhaust gas stream 14. The second contour portion 62 of one or more embodiments is angled relative to the exhaust gas stream 14 at an angle between 0 and 80 degrees. As illustrated in FIG. 6, the second contour portion 62 of an embodiment is angled relative to the exhaust gas stream 14 at an angle between 0 and 45 degrees. As illustrated in FIG. 7, the second contour portion 62 of an embodiment is angled relative to the exhaust gas stream 14 at an angle between 45 and 90 degrees.

Referring to FIG. 8, the drip lip 56 of an embodiment extends radially and axially outward along a straight line 64. The drip lip 56 of FIG. 8 extends at an angle of between 10 and 80 degrees relative to the direction of the exhaust gas stream 14 in an embodiment, at an angle of between 20 and 70 degrees relative to the direction of the exhaust gas stream 14 in an embodiment, or at an angle of between 30 and 60 degrees relative to the direction of the exhaust gas stream 14 in an embodiment.

The shield 20, as illustrated in the embodiments of FIGS. 6-8, may include the second portion 36 as a sealing portion extending into the crevice, gap, and/or clearance against the DEF injector 18 and/or between the DEF injector 18 and the side wall 28 or other portion of the aftertreatment system 12. Any other portion, component, or feature of other embodiments described in the present disclosure may form part of the embodiments of FIGS. 6-8.

The drip lip 56 of certain embodiments are sized such that the drip lip 56 extends into the exhaust gas stream 154 a first distance D substantially equal to or greater than a second distance S defined by a length of the first portion 32 or a depth of the opening 26, such as shown in the embodiment of FIG. 6. The drip lip 56 of certain embodiments is sized such that the drip lip 56 extends into the exhaust gas stream 14 the first distance D less than the second distance S defined by the length of the first portion 32 or the depth of the opening 26, such as shown in the embodiments of FIGS. 7 and 8.

Embodiments of the present disclosure may relate to a vertically-extending exhaust aftertreatment system 12 with a horizontally-oriented DEF injector 18. In such systems, the shield 20 of embodiments described herein prevents or reduces liquid DEF from collecting in or otherwise flowing to a gap, clearance, or crevice between the DEF injector 18 and the side wall 28 as gravity may otherwise cause liquid DEF to trickle, drip, or flow down the dosing module or injector face 22 to collect in the crevice. Therefore, the shield 20 may prevent or reduce DEF from collecting and crystallizing to create a solid deposit that interferes with the operation of the DEF injector 18 and/or other components of the system 10. A solid deposit may be otherwise caused at least partially to lower temperatures at the injector face 22 that may prevent the liquid DEF from evaporating and dispersing into the exhaust flow. The embodiments of the present disclosure may prevent or reduce liquid DEF from contacting the cool surfaces of the DEF injector 18 and/or the side wall 28 by providing the shield 20. The shield 20 may be a metallic gasket, such as a steel or stainless steel shield in non-limiting examples. The shield 20 may increase the temperature to which liquid DEF is exposed, thus promoting its evaporation into the exhaust stream. The shield 20 may also reduce or eliminate the crevice that may otherwise be present between the DEF injector 18 and the side wall 28. Different shield shapes may be used to direct liquid DEF away from the relatively cool surface(s) of the DEF injector 18 and the side wall 28 and into the exhaust flow to further promote evaporation. The present disclosure includes any single embodiment or combination of features of multiple embodiments to provide the shield 20 shaped, positioned, and/or otherwise configured to reduce or prevent liquid DEF from dripping, collecting, or otherwise moving into the crevice, clearance, and/or gap that may be formed between the DEF injector 18 and the side wall 28 and/or another portion of the engine aftertreatment system 12.

Any shield 20, component of the aftertreatment system 12 or DEF injection system 12, or any portion(s) thereof described in any embodiment herein may be integrally formed with another or formed separately and joined together in additional embodiments of the present disclosure. Any shield 20, component of the aftertreatment system 12 or DEF injection system 10, or any portion(s) thereof described in any embodiment herein may be formed as a metal, ceramic, composite, polymeric, elastomeric, and/or other material.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A shield for a diesel exhaust fluid injector mounted horizontally in an opening in a side wall of an exhaust gas aftertreatment system of an internal combustion engine, the diesel exhaust fluid injector configured to inject diesel exhaust fluid in a direction generally normal to the side wall into a mixer positioned in an exhaust gas stream such that exhaust gas flows in a substantially vertical direction through a housing of the exhaust gas aftertreatment system, the shield comprising:
   a first portion extending axially and configured to be coaxial with the diesel exhaust fluid injector between the side wall of the exhaust gas aftertreatment system and the diesel exhaust fluid injector;
   a second portion extending radially inwardly from the first portion and configured to contact and at least partially cover an annular region of an injector face extending radially at an injection end of the diesel exhaust fluid injector; and
   a drip lip extending axially away from the second portion and configured to direct diesel exhaust fluid away from the injector face and into the exhaust gas stream.

2. The shield of claim 1, wherein the drip lip extends both axially and radially away from the second portion.

3. The shield of claim 2, wherein the drip lip comprises a curved contour extending axially and radially away from the second portion.

4. The shield of claim 3, wherein the curved contour comprises a first contour portion configured to extend substantially perpendicular to the exhaust gas stream.

5. The shield of claim 4, wherein the curved contour further comprises a second contour portion configured to extend at an angle between 0 and 80 degrees relative to the exhaust gas stream.

6. The shield of claim 2, wherein the drip lip extends radially and axially outward along a straight line.

7. The shield of claim 2, wherein the drip lip is configured to extend into the exhaust gas stream a first distance that is equal to or greater than a second distance defined by a length of the first portion.

8. The shield of claim 2, wherein the drip lip is configured to extend into the exhaust gas stream a first distance that is less than a second distance defined by a length of the first portion.

9. A diesel exhaust fluid injection system for an exhaust gas aftertreatment system for an internal combustion engine having an exhaust gas stream flowing substantially vertically through a housing of the exhaust gas aftertreatment system, the diesel exhaust fluid injection system comprising:
   a diesel exhaust fluid injector, having an injector face extending radially at an injection end of the diesel exhaust fluid injector, and mounted horizontally in an opening in a side wall of the exhaust gas aftertreatment system and configured such that diesel exhaust fluid is injected in a direction generally normal to the side wall into a mixer positioned in the exhaust gas stream; and
   a shield extending radially inwardly and contacting and at least partially covering an annular region of the injector face at a location axially inside of the side wall of the exhaust gas aftertreatment system,
   wherein the shield includes a drip lip extending away from the injector face and into the exhaust gas stream and configured to direct diesel exhaust fluid away from the injector face and into the exhaust gas stream.

10. The system of claim 9, wherein the drip lip extends both axially and radially away from the injector face.

11. The system of claim 10, wherein the drip lip comprises a curved contour extending axially and radially away from the injector face.

12. The system of claim 11, wherein the curved contour comprises a first contour portion extending substantially perpendicular to the exhaust gas stream.

13. The system of claim 12, wherein the curved contour further comprises a second contour portion extending at an angle between 0 and 80 degrees relative to the exhaust gas stream.

14. The system of claim 10, wherein the drip lip extends radially and axially outward along a straight line.

15. The system of claim 10, wherein the drip lip extends into the exhaust gas stream a first distance that is equal to or greater than a second distance defined by a depth of the opening of the side wall.

16. The shield of claim 10, wherein the drip lip extends into the exhaust gas stream a first distance that is less than a second distance defined by a depth of the opening of the side wall.

* * * * *